United States Patent [19]

Jeffrey et al.

[11] Patent Number: 4,756,836

[45] Date of Patent: Jul. 12, 1988

[54] DOWNHOLE HYDROGEN SULFIDE SCAVENGING IN DRILLING MUD USING IRON CHELATES

[75] Inventors: Gaines C. Jeffrey, Houston; Lance A. Cooper, Lake Jackson, both of Tex.; Sharon S. Whipple, Sanford, Mich.

[73] Assignee: The Dow Chemical Company, Midland, Mich.

[21] Appl. No.: 860,598

[22] Filed: May 7, 1986

[51] Int. Cl.[4] .......................... C09K 7/02; C23F 11/10
[52] U.S. Cl. ..................................... 210/750; 210/758; 175/64; 166/267; 252/8.514
[58] Field of Search ............... 210/721, 722, 749, 750, 210/718, 758; 175/64; 166/267; 252/8.514; 423/243

[56] References Cited

U.S. PATENT DOCUMENTS

| | | | |
|---|---|---|---|
| 3,226,320 | 12/1965 | Meuly et al. | 423/206 |
| 3,928,211 | 12/1975 | Browning et al. | 175/64 |
| 3,933,993 | 1/1976 | Salemme | 423/243 |
| 4,076,621 | 2/1978 | Hardison | 210/698 |
| 4,091,074 | 5/1978 | Gorai et al. | 423/243 |
| 4,147,212 | 4/1979 | Tisdale | 175/64 |
| 4,252,655 | 2/1981 | Carney | 210/749 |
| 4,324,298 | 4/1982 | Fox | 175/64 |
| 4,473,115 | 9/1984 | Oakes | 175/64 |
| 4,539,122 | 9/1985 | Son et al. | 252/8.551 |

OTHER PUBLICATIONS

Garrett, et al, "Chemical Scavengers for Sulfides in Water-Base Drilling Fluids," Journal of Petroleum Technology, Jun. 1979, pp. 787–796.

Primary Examiner—Richard V. Fisher
Assistant Examiner—Richard D. Jordan
Attorney, Agent, or Firm—Gunn, Lee & Jackson

[57] ABSTRACT

For drilling mud during use in drilling a well, an additive of FE Chelate is disclosed. The chelating agent preferably includes EDTA, HEDTA, NTA, or DTPA. It is oxygen regenerated at the surface to enable repeated use to remove $H_2S$. Any $H_2S$ is converted to elemental sulfur, reducing risk of poisoning.

14 Claims, 1 Drawing Sheet

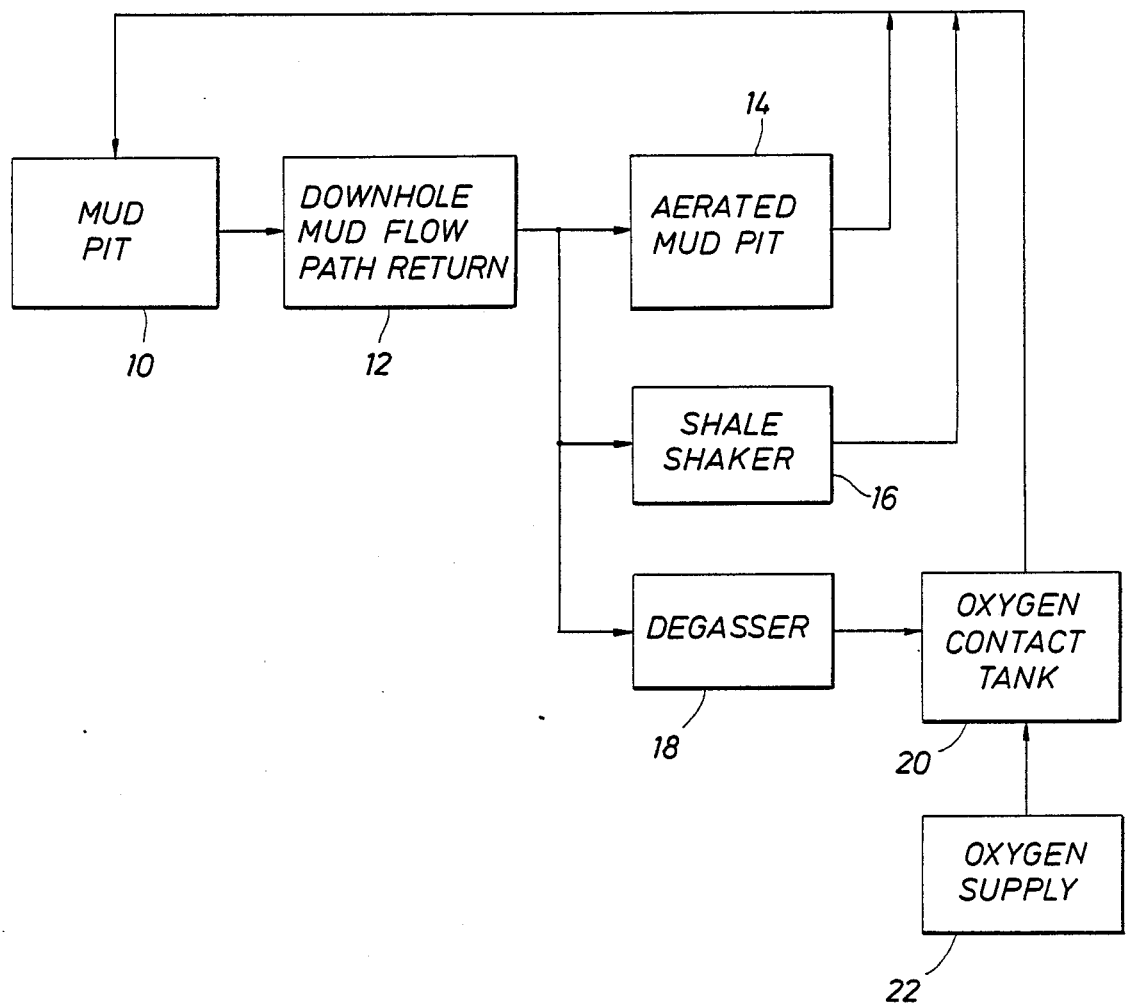

DOWNHOLE HYDROGEN SULFIDE SCAVENGING IN DRILLING MUD USING IRON CHELATES

BACKGROUND OF THE DISCLOSURE

In drilling an oil well, the ordinary procedure involves positioning a drill stem including a string of pipe and drill bit in a borehole which is formed by the drill bit. A lubricant known as drilling mud (comprising primarily various clays and water) is circulated downwardly through the drill stem and is returned to the surface in the annular space on the exterior of the drill stem. Depending on the geology, certain formations may be encountered by the borehole which liberate hydrogen sulfide. The hydrogen sulfide is picked up in the drilling mud and carried to the surface. There are two particularly distinct problems arising from this. First of all, when the hydrogen sulfide enters the flowing drilling mud, it reacts with the ferrous materials comprising the drill stem. Hydrogen sulfide corrosively attacks most ferrous drill pipe. This exposes at least 95% of the drill pipe to damage from hydrogen sulfide. The corrosion damage is cumulative, and accelerates with an increase in concentration of hydrogen sulfide or temperature increase. It is therefore undesirable to expose the metal components in the borehole to hydrogen sulfide.

Even more importantly, the drilling mud is returned to the surface where it is pumped from the annular space into mud pits. In the mud pits, dissolved gas bubbles in the mud float to the surface and poison the atmosphere. This may expose personnel near the drilling rig to poisoning from the hydrogen sulfide gas. Hydrogen sulfide gas can be fatal to nearby personnel even in trace quantities. Moreover, if it escapes into the atmosphere, it may well attack vegetation also. Hydrogen sulfide is quite active chemically; it is undesirable to release any hydrogen sulfide to the atmosphere. For these reasons, it is very desirable to remove hydrogen sulfide to avoid damage to the equipment, possible death and destruction.

Inevitably, all entrained gas bubbles and dissolved gases in the drilling mud must be removed to control the weight of the drilling mud. When the mud becomes gas cut, it becomes light and frothy and is no longer able to provide the mud weight required for drilling procedures. In particular, this weight requirement requires constant monitoring to assure that the drilling mud that is recirculated from the annular space into the mud pits and back through the drill stem is not reduced in weight by gases absorbed during drilling.

Various efforts have been made in the past to deal with this problem. As an example, one such effort involves U.S. Pat. No. 4,011,304. This reference involves a gas treatment procedure not concerned with drilling mud. U.S. Pat. No. 4,220,585 is more aptly concerned with a viscosity control agent and sets forth titanium or zirconium lignosulfonates. In U.S. Pat. No. 4,278,646, an acid pH system is set forth. In U.S. Pat. No. 4,332,687, a heavy metal removal process is set forth. U.S. Pat. No. 4,252,655 is a zinc chelate system. As will be understood from these references, a downhole hydrogen sulfide scavenging system utilizing iron chelates in the drilling fluid (as set forth in greater detail hereinafter) is able to remove hydrogen sulfide from the drilling mud and accomplishes this in an improved and unobvious manner.

A variety of situations may be encountered in a drilling process. The mud may simply be circulated down through the drill stem and returned through the annular space. If that is the case, it is important to add to the mud processing equipment an aeration process step in which the mud is sprayed through the air to obtain chelate regeneration. Without regeneration, the iron chelate material will have to be added continuously. Recirculation of the chelate reduces the required supply of the chelate. This extends the life of the chelate and thereby reduces the needed quantity of additive. The present procedure sets forth an important step of regeneration of the iron chelate by exposing it to air (including oxygen) through the use of an aeration process step.

Sometimes during the drilling process, the mud may pick up particles which have to be removed with a device known as a shale shaker. The discharged stream of mud recovered from the well is transferred through suitable pipes to a shale shaker. The mud is poured over a conveyer belt. The conveyer belt is more aptly woven screen which permits the drilling mud to trickle through the perforations in the screen. The screen carries the particulate matter away for disposal. After the drilling mud picks up particles, they are removed by this procedure and while the mud flow is at the surface, the iron chelate mixed in the drilling mud is exposed to oxygen in the air for chelate regeneration.

In other instances of drilling a well, a formation may be encountered which produces a gas which is dissolved in the drilling mud. The gas may be completely free of hydrogen sulfide or may be mixed with it. When a well produces combustible gas mixed with hydrogen sulfide, the gas is called sour gas. The present invention contemplates the use of a degaser connected to the mud system. The degaser liberates gas bubbles from the mud. In the instance that sour gas is encountered, the iron chelate of this disclosure converts the gaseous hydrogen sulfide, this conversion typically occurring while the mud is flowing in the annular space back to the surface. The mud thereafter is introduced to the degaser whereupon bubbles of natural gas carried in the drilling mud are removed. Dissolved gas and bubbles are removed by permitting vaporization to atmosphere. While the surface degassing procedure removes combustible gases in the drilling mud, oxygen (typically by introduction of air) is permitted to bubble through the drilling mud and thereby regenerates the chelate.

Without regard to specifics, the present procedure contemplates the addition of an iron chelate to a flowing mud stream. It can be introduced as a solution in water or as a particulate ground to a suitable size and mixed in the drilling mud. So long as no hydrogen sulfide is encountered, the iron chelate can be recirculated indefinitely in the mud system with nominal circulation and chemical loss. When hydrogen sulfide is encountered, a conversion occurs as will be described whereupon hydrogen sulfide is converted to elemental sulfur. Moreover, the iron chelate continues in circulation and is later regenerated with oxygen. This enables the iron chelate to be recirculated indefinitely subject to nominal circulation and chemical loss.

While the foregoing is directed to the background of the present disclosure and the specification set forth below describes a specific exemplary procedure, an understanding of this disclosure is aided and assisted by reference to the included drawings.

BRIEF DESCRIPTIONS OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The only drawing incorporated with this disclosure sets forth in block diagram form sequential steps in the handling of a mud flow system and includes alternate procedures for regeneration of an iron chelate for removal of hydrogen sulfide.

DETAILED DESCRIPTION OF THE PREFERRED EMBODIMENT

Attention is directed to the only drawing which is a schematic of procedures which can be used in drilling a well. In particular, the drilling procedure contemplates the enhancement obtained by use of the iron chelate described hereinafter for removal of the hydrogen sulfide which might be mixed in the drilling mud. Beginning with the drawing, the numeral 10 identifies a mud system where drilling mud is mixed and stored.

Drilling mud is ordinarily a water based clay system, often containing barites. Other muds including organic based materials can be treated also. One or more pits are typically deployed at a drilling site. Mud is removed from the pits by a large pump and delivered downhole and returned. This is indicated at 12 in the drawings. The typical flow path involves equipment that is well known including delivery of mud under pressure at the top of the drill stem. Mud is introduced through a goose neck connected above a kelly which supports the drill stem. The drill stem is comprised of one or more joints of drill pipe serially connected to drill collars with a drill bit at the bottom of the string. While the length of the drill stem increases with increasing depth of the hole, the drill stem delivers the mud to the bottom where the drill bit is lubricated and cuttings from the bottom of the borehole are washed through the annular space around the drill stem. This carries the mud away from the bit area and carries cuttings along with the mud. Depending on the formations encountered, various gases may be liberated and are also conducted upwardly in this mud stream.

The gases may or may not be sour, that is, may or may not contain hydrogen sulfide. The gas and mud flow is delivered back to the surface. The mud stream is usually delivered back to the mud pit for treatment as necessary. In the sequence shown here, the mud may be delivered to an aerated mud pit 14. It may be helpful to spray the mud to gain air exposure so that it is exposed with significant surface area in contact with oxygen. However, there are limits on oxygen exposure. One desirable benefit of oxygen on the additives to be described hereinbelow is regeneration. This regeneration sequence enables the mud additives to be recirculated indefinitely. On the other hand, oxygen may damage the mud, therefore, only a limited exposure to oxygen is normally used to thereby avoid mud oxidation. The circumstances encountered in drilling may vary widely. For instance, as described to this juncture, it may be necessary to flow the mud through the aeration step for regeneration and return the mud to the mud pit. However, other alternate mud treatment steps may be advisable. As an example, the borehole may penetrate a shale formation which produces substantial shale particles in the drilling mud. To this end, one step in the treatment of the mud prior to recirculation is to pass the mud through a shale shaker 16. The shale shaker typically includes a conveyer made of screen wire. Holes or perforations in the woven screen enable cuttings and particles to collect on top of the conveyer which rotates to carry the particles off to the side. The drilling mud, however, trickles through the holes or perforations in the screen and is collected in a trough for recirculation free of cuttings and particles.

The numeral 18 identifies a degaser. Again, the well borehole may penetrate a formation which produces gases. The gases typically dissolve in the drilling mud or form bubbles in the mud. The gas cut mud is conducted to the surface and is delivered to the degaser. The degaser (through spray systems, or alternatively, in a vacuum chamber) removes gas form the drilling mud. The removal of the gas from the drilling mud assists in restoring mud weight integrity. Moreover, this is a safety step, namely, removing potentially any poisonous explosive gas from the drilling mud. After the drilling mud gases have been removed, the mud is then flowed through an oxygen contact tank 20 which is connected with a suitable oxygen supply source 22. Oxygen is typically in the form of air is bubbled through the mud to accomplish regeneration of the additive as will be described in detail hereinafter. The mud is returned to the mud pit 10 either from the aerated mud pit 14, the shale shaker 16, or from the oxygen contact tank 20. In typical circumstances, all these treatments are not required on every well but such mud treatment and purification for recirculation is typically undertaken on many wells. Depending on the volume of gas, the degaser 18 should be vented away from the equipment, or perhaps flared. The contact tank 20 may need separate venting also.

With this mud circulation route in view, the present disclosure is more aptly directed to an additive for the drilling mud. It is preferably supplied in water soluble form. An alternative form is dried or crystalline particles of a suitable particle size. After additive mixture is in the mud with periodic additive regeneration, the entrained hydrogen sulfide gas is converted, as will be described, to elemental sulfur and the additive is repetitively regenerated for subsequent additional use to reduce the total supply required of the additive.

In contrast with the use of metal salts, such as zinc carbonates, the present procedure is advantageous in using a regenerative iron chelate. Zinc carbonate (or other zinc salts) typically form insoluble zinc sulfide which limits the use of the material to a single pass. The iron chelate of the present disclosure converts hydrogen sulfide to sulfur and enables subsequent regeneration of the metal chelate by exposure to oxygen for repetitive recycling and reuse. As a further advantage, regeneration by oxygen at the surface cuts down the oxygen which contributes to corrosion of the drill stem. Another advantage of the iron chelate is that it scavenges oxygen in the mud stream to cut down oxygen assisted corrosion of the drill stem. The procedure of this disclosure involves use of iron chelates as a drilling mud additive. They have advantages over previous additives such as zinc carbonate in that the hydrogen sulfide is converted into elemental sulfur; also, regeneration by oxygen exposure of the iron chelate enables reuse as the mud is recycled. The various iron chelates contemplated by the present disclosure include Fe HEDTA. This is a chelate of iron and hydroxyethylethylnediaminetriacetic acid (HEDTA). Alternatively, one might use chelates of iron and ethylenediaminetetraacetic (EDTA), nitrilotriacetic acid (NTA) or Diethylenetriaminepentaacetic acid (DTPA).

The complexes of these chelating agents with iron will be written hereinafter as Fe chelate to symbolize the additive for drilling mud. In the ordinary course, the Fe chelate is added to the drilling mud at the mud pit before circulation into the well. The amount can be varied widely so long as excess water is not added to dilute the mud. In a dry crystalline form, no water is normally added; the dry form goes into solution and is distributed through the mud. The Fe chelate is mixed in drilling mud having a pH range typically of about 8 to 12. The reaction with hydrogen sulfide liberates elemental sulfur. To a very small degree, some oxides of sulfur may be found in the mud but they do not pose the risks one encounters with hydrogen sulfide.

After sour gas has mixed into the drilling mud, typically on penetration of a formation having sour gas, the iron chelate in the mud reacts to liberate sulfur. After liberation the elemental sulfur is typically entrained as particles in the mud flow mentioned above. The first equation below describes the reaction of the sour gas with the iron chelate. The second reaction describes recharging of the iron chelate to restore it to its initial condition so that it can be recycled and used again on recirculation through the borehole to convert additional $H_2S$.

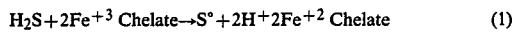

$$H_2S + 2Fe^{+3}\text{ Chelate} \rightarrow S° + 2H^+ + 2Fe^{+2}\text{ Chelate} \quad (1)$$

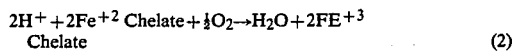

$$2H^+ + 2Fe^{+2}\text{ Chelate} + \tfrac{1}{2}O_2 \rightarrow H_2O + 2FE^{+3}\text{ Chelate} \quad (2)$$

Particular focus should be placed on the equations and the location at which iron chelate changes occur. The conversion of sour gas described in the first equation occurs from the point of entry of the sour gas into the mud stream and hence is substantially accomplished downhole, relatively soon after the gas is encountered. This means that this conversion of sour gas occurs at elevated temperature and pressure at bottom hole conditions. This conversion requires the exposure of sour gas in the mud to the Fe chelate. As will be observed, the first equation dictates that 2 moles of the iron chelate be added for every mole of hydrogen sulfide. Should there be less additive than this ratio, there may be incomplete removal of hydrogen sulfide. An excessive supply of the iron chelate does not provide any known adverse affect except a possible change in mud rheology. Referring now to the second equation, it will be observed that oxygen is required. The hydrogen ion shown in the second equation is readily available in the water based mud system. An excess supply of oxygen over that required assures rapid regeneration of the iron chelate. As noted earlier, it is generally not desirable to entrain $O_2$ in the mud because oxidation may degrade mud performance.

A valuable feature of this process is the use of iron; whether it is supplied in the $Fe^{+2}$ or $Fe^{+3}$ form, exposure at some point in the mud flow process changes the form to $Fe^{+3}$ to thereby prepare the chelate for $H_2S$ conversion. This preference is suggested by the fact that the second equation proceeds to the right. A measured amount of oxygen is furnished where an aerated mud pit 14 provides oxygen for regeneration of the iron chelate. Alternatively, oxygen exposure can occur in the screening process carried out in shale shaker. In some instances, a series of shale shakers will be required. The first shale shaker might utilize a very porous screen to take out the largest particles in the mud flow. A subsequent shale shaker then removes smaller particles. Repetitive passes of the mud through the various screens enables the particles to be removed while simultaneously exposing the mud flowing through the screens to oxygen for regeneration of the chelate. Additionally, the mud may be so gas cut that is has to pass through a degaser represented at 18 and thereafter flows through an oxygen contact tank 20. This may again take the form of an aerated mud pit. Alternatively, any source of oxygen (substantially pure or dilute as in air) can be used to bubble up through the mud. In the latter case, an air pump having a number of jets located in the bottom of a mud tank will suffice to agitate the mud and expose it to the bubbling oxygen.

The process thus described contemplates the recirculation of the iron chelate time and time again. This typically occurs during the drilling of the well where the mud is circulated indefinitely until the well is complete. For this reason, a smaller portion of additive is required to remove sour gas from the mud. Therefore, cost efficiencies can be achieved.

In a laboratory scale test, a glass column (about 0.9 meter by 2.5 cm) was equipped with a glass entry port at the lower end. Just above the entry port, a glass frit was installed for dispersion. A sampling valve was placed just above the glass frit. The gas entry port was connected to a source of $H_2S$ to flow through the gas entry port and up the column. The gas source was 5% $H_2S$ and 95% nitrogen. The column was filled with mud, specifically 350 ml of mud. The mud was 14.1 ppb lignosulfonate based mud reconstituted in a Waring blender with 6.8 gm of Fe HEDTA (5% Fe). The pH was adjusted to 12.0 with NaOH. The gas was bubbled up at the column until the pH changed to 9.0. Then, air was bubbled up the column until the mud pH changed to 10.0 evidence of regeneration. Then, a mud sample was tested for elemental sulfur. This sequence was repeated three times. After each cycle, the sulfur was measured in ppm.

| Cycle | Sulfur in ppm |
| --- | --- |
| 1 | 97 |
| 2 | 353 |
| 3 | 1200 |
| 4 | 1510 |

This would appear to verify the reactions set forth in this disclosure, namely, the fact that the chelating agent is oxygen regenerated and sulfur is entrained from the $H_2S$ while flowing up the mud filled column.

The iron chelate is stable up to the temperatures encountered in the deep wells. Sufficiently deep wells may encounter temperatures in the range of 400 degrees F. with some chemical loss with increased temperature. It should be noted that increased temperatures speed up the rate of reaction so that the iron chelate reacts more rapidly with the freely introduced hydrogen sulfide.

While the foregoing is directed to the preferred embodiment, the scope is determined by the claims which follow.

What is claimed is:

1. A method of decreasing hydrogen sulfide entrained in a mud flow while drilling an oil well comprising the steps of:
   (a) at a well head, adding iron chelate to the mud flow;
   (b) circulating the mud bearing the iron chelate down the well in the drill string to expose entrained hydrogen sulfide from a formation to the additive for conversion of hydrogen sulfide into elemental sulfur;
   (c) circulating the flowing mud down the drill string and up the well to the surface to recover the mud where the additive is then exposed to a regenerating agent; and
   (d) continuing the mud in circulation with the regenerated additive repetitively during the drilling process.

2. The method of claim 1 wherein the additive is iron chelate including chelates of EDTA, HEDTA, NTA, or DTPA.

3. The method of claim 1 wherein regeneration is accomplished by exposure of oxygen.

4. The method of claim 1 wherein drilling mud circulates downwardly into the borehole through a drill stem and carries iron chelate for reaction with hydrogen sulfide wherein the valence of the iron is changed from +3 to +2.

5. The method of claim 4 wherein regeneration is accomplished by exposure to elemental oxygen which converts the iron in the additive from a valence of +2 to valence of +3 to thereby enable recirculation of the additive with the mud flow.

6. The method of claim 5 including the step of conversion of recovered elemental sulfur into oxides of sulfur.

7. The method of claim 1 wherein the iron chelate is added as a water solution.

8. The method of claim 1 wherein the iron chelate is added as a crystalline solid.

9. The method of claim 1 wherein the iron chelate is dissolved in water prior to adding to the mud.

10. In combination with a flowing drilling mud delivered to a well during drilling operations, an additive for decreasing $H_2S$ concentration in the mud, the additive comprising an effective amount of iron chelate mixed into the mud to reduce $H_2S$ concentration in mud circulating in a well.

11. The additive of claim 10 wherein the iron chelate is a ferric chelate of EDTA, HEDTA, NTA or DTPA.

12. The additive of claim 11 wherein the ferric chelate is particulate in form.

13. In combination with a flowing drilling mud delivered to a well during drilling operations, an additive for decreasing $H_2S$ concentration in the mud, the additive comprising a particulate ferric chelate in an effective amount adapted to be mixed in the mud to reduce $H_2S$ concentration.

14. The additive of claim 13 which is a ferric chelate of EDTA, HEDTA, NTA or DEPA.

* * * * *